United States Patent
Jones et al.

(10) Patent No.: US 10,365,808 B2
(45) Date of Patent: Jul. 30, 2019

(54) METADATA-BASED NAVIGATION IN SEMANTIC ZOOM ENVIRONMENT

(71) Applicant: Microsoft Technology Licensing, LLC, Redmond, WA (US)

(72) Inventors: Taurean Addair Jones, Issaquah, WA (US); Chairy Cheung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 15/141,635

(22) Filed: Apr. 28, 2016

(65) Prior Publication Data

US 2017/0315707 A1    Nov. 2, 2017

(51) Int. Cl.
G06F 3/048    (2013.01)
G06F 3/0484    (2013.01)
G06F 16/2455    (2019.01)
G06F 3/0481    (2013.01)
G06F 16/242    (2019.01)

(52) U.S. Cl.
CPC ........ G06F 3/04845 (2013.01); G06F 3/0481 (2013.01); G06F 3/0484 (2013.01); G06F 3/04842 (2013.01); G06F 16/2428 (2019.01); G06F 16/2455 (2019.01); G06F 2203/04806 (2013.01)

(58) Field of Classification Search
CPC ........ G06F 17/2785–2795; G06F 2003/04806; G06F 17/30731; G06F 2203/04806
See application file for complete search history.

(56) References Cited

U.S. PATENT DOCUMENTS

| | | |
|---|---|---|
| 8,448,083 B1 | 5/2013 | Migos et al. |
| 8,745,513 B2 | 6/2014 | Crystal |
| 8,838,597 B1 * | 9/2014 | Gottumukkala .. G06F 17/30946 707/736 |
| 2007/0182999 A1 | 8/2007 | Anthony et al. |

(Continued)

OTHER PUBLICATIONS

"International Search Report and Written Opinion Issued in PCT Application No. PCT/US2017/026479", dated Jul. 21, 2017, 13 Pages.

(Continued)

Primary Examiner — Claudia Dragoescu
(74) Attorney, Agent, or Firm — Workman Nydegger

(57) ABSTRACT

Navigation using metadata exposed in a semantic zooming environment. The semantic zooming environment has multiple zoom levels. For a given displayed object, the displayed object may not just be a different size, but actually be displayed differently at each semantic zoom level. At one or more of the semantic zoom levels, a displayed object may have displayed metadata of the displayed object. A user may interact with the metadata to trigger a query on that metadata against a data source, causing an entire collection of objects to be populated that also have some relationship to that same metadata. The collection of objects may itself be populated within a semantic zoom environment that additionally exposes metadata, allowing the process to repeat. Thus, the principles described herein allow advanced navigation techniques whereby data may be narrowed down and/or change direction, easily by users manipulating metadata exposed in semantic zoom environments.

20 Claims, 4 Drawing Sheets

(56) References Cited

U.S. PATENT DOCUMENTS

| | | | |
|---|---|---|---|
| 2007/0192739 A1 | 8/2007 | Hunleth et al. | |
| 2009/0327969 A1* | 12/2009 | Estrada | G06F 3/04815 715/848 |
| 2010/0086022 A1 | 4/2010 | Hunleth et al. | |
| 2010/0302176 A1 | 12/2010 | Nikula et al. | |
| 2011/0047509 A1* | 2/2011 | Arrasvuori | G01C 21/3673 715/815 |
| 2011/0316884 A1 | 12/2011 | Giambalvo et al. | |
| 2012/0042282 A1* | 2/2012 | Wong | G06F 17/30994 715/811 |
| 2012/0254798 A1* | 10/2012 | Bickel | G06F 3/0484 715/817 |
| 2013/0067420 A1 | 3/2013 | Pittappilly et al. | |
| 2013/0191767 A1 | 7/2013 | Peters et al. | |
| 2014/0181645 A1 | 6/2014 | Macbeth | |
| 2014/0281868 A1 | 9/2014 | Vogel et al. | |
| 2015/0169531 A1 | 6/2015 | Campbell et al. | |
| 2015/0215245 A1 | 7/2015 | Carlson et al. | |
| 2016/0140447 A1* | 5/2016 | Cohen | G06N 5/02 706/52 |

OTHER PUBLICATIONS

"Graphical user interface", Retrieved from <<http://en.wikipedia.org/w/index.php?title=Graphicaluserinterface&oldid=579694866>>, Nov. 1, 2013, 9 Pages.

"Zooming user interface", Retrieved from <<http://en.wikipedia.org/w/index.php?title=Zooming user interface&oldid=231795919>>, Aug. 14, 2008, 4 Pages.

Diep, et al., "Visualizing E-mail with a Semantically Zoomable Interface", In Proceedings of IEEE Symposium on Information Visualization, Oct. 10, 2004, 2 Pages.

Khella, et al., "Pocket PhotoMesa: A Zoomable Image Browser for PDAs", In Proceedings of the 3rd International Conference on Mobile and Ubiquitous Multimedia, Oct. 27, 2004, pp. 19-24.

* cited by examiner

METADATA-BASED NAVIGATION IN SEMANTIC ZOOM ENVIRONMENT

BACKGROUND

Computers and networks have ushered in what has been called the "information age". One technology that enables computer users to navigate through information is referred to as "semantic zoom". For instance, when a user zooms in on a displayed object, rather than the displayed object simply getting bigger, the displayed object is displayed in a different way that is more appropriate for being zoomed in. For instance, if the displayed object was a representation of an image file, a zoomed-out version might simply just show the name of the file. Zooming in further might display a thumbnail of an image in the image file. Zooming in further might actually open an image-viewer and show the entire image, and so forth.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to navigation using metadata exposed in a semantic zooming environment. The semantic zooming environment has multiple zoom levels. For a given displayed object, the displayed object may not just be a different size, but actually be displayed differently at each semantic zoom level. At one or more of the semantic zoom levels, a displayed object may have displayed metadata of the displayed object. A user may interact with the displayed metadata to trigger a query on that metadata against a data source, causing an entire collection of objects to be populated that also have a relationship to that same metadata. The collection of objects may itself be populated within a semantic zoom environment that additionally exposes metadata, allowing the process to repeat, thereby facilitating a new form of navigation through large quantities of data.

Thus, the principles described herein allow advanced navigation techniques whereby data may be narrowed down and/or change direction, easily by users manipulating metadata exposed in semantic zoom environments. This technique can thereby become powerful technology for navigating through data to quickly obtain data of interest.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to navigation using metadata exposed in a semantic zooming environment. The semantic zooming environment has multiple zoom levels. For a given displayed object, the displayed object may not just be a different size, but actually be displayed differently at each semantic zoom level. At one or more of the semantic zoom levels, a displayed object may have displayed metadata of the displayed object. A user may interact with the displayed metadata to trigger a query on that metadata against a data source, causing an entire collection of objects to be populated that also have a relationship to that same metadata. The collection of objects may itself be populated within a semantic zoom environment that additionally exposes metadata, allowing the process to repeat, thereby facilitating a new form of navigation through large quantities of data.

Thus, the principles described herein allow advanced navigation techniques whereby data may be narrowed down and/or change direction, easily by users manipulating metadata exposed in semantic zoom environments. This technique can thereby become powerful technology for navigating through data to quickly obtain data of interest. Some introductory discussion of a computing system will be described with respect to FIG. 1. Then, the operation of navigation through semantic zoom environments via metadata exposed at one or more levels of the semantic zoom will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
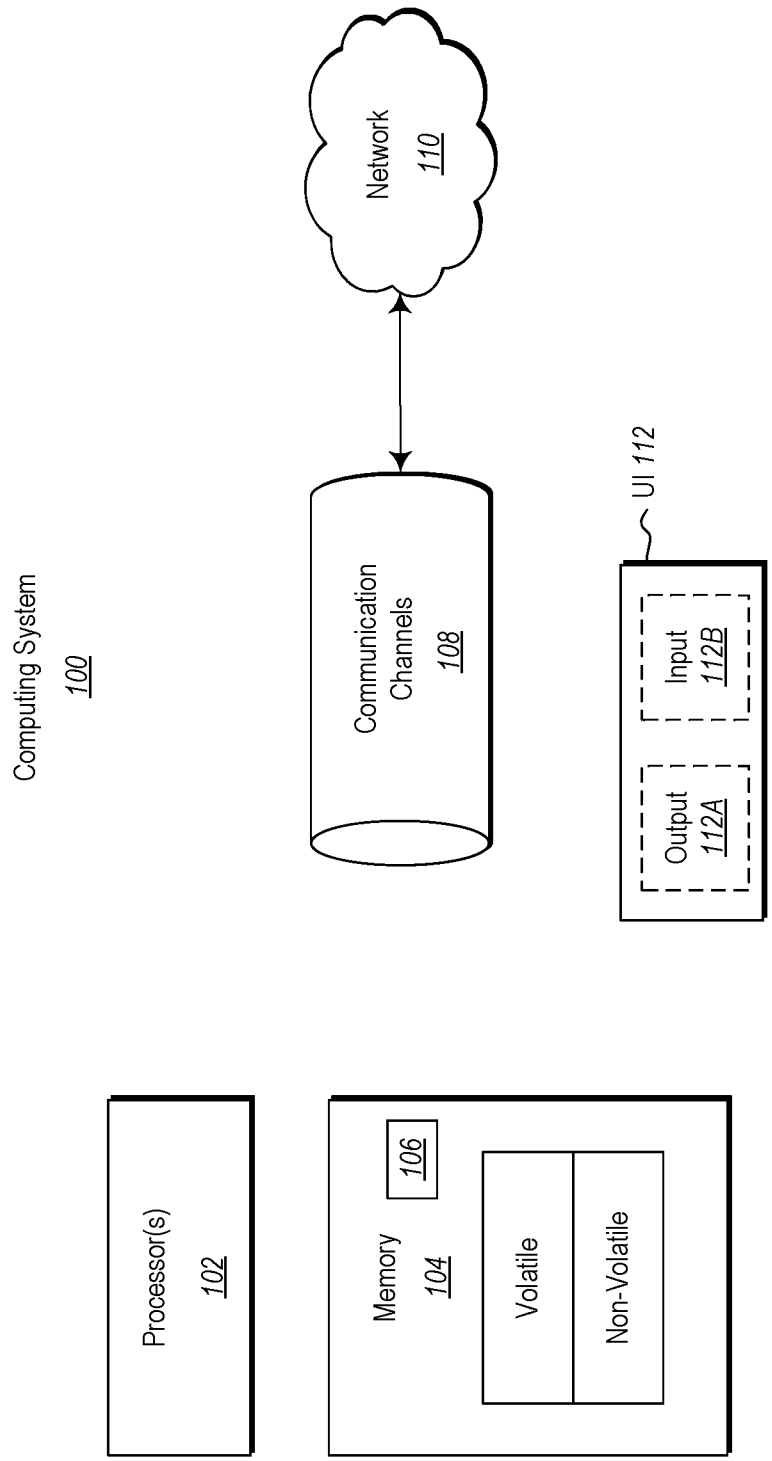
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The principles described herein provide for the opportunity to navigate through a semantic zoom environment by populating collections of data based on selections of metadata exposed in one or more levels of the semantic zoom environment. In this description and in the claims, a semantic zoom environment is defined as an environment that includes a set of multiple semantic zoom levels, and a control for zooming in and/or zooming out in order to navigate from one semantic zoom level to another neighboring semantic zoom level.

Each of the semantic zoom levels displays at least one object that is also represented in further level of semantic detail in a neighboring semantic zoom level that is navigated to by zooming in and/or is represented in less semantic detail in a neighboring semantic zoom level that is navigated to by zooming out. Semantic detail is not strictly a function of size of the object, but further semantic detail may alternatively or in addition change the manner in which an object is displayed and/or what details about the object are also displayed.

Examples of metadata for a displayed object include one or more properties of the displayed object and/or one or more property values of the displayed object. The metadata may be predetermined metadata, or may be generated metadata that is calculated when the metadata is selected, or which is based on other context. The metadata might be a visualization type for the displayed object, or for data that is displayed within the displayed object. The displayed object may be a collection of displayed objects (e.g., a selected collection of displayed objects). In that case, the selectable metadata may be generated based on the aggregation of the selected displayed objects.

Figure 2:
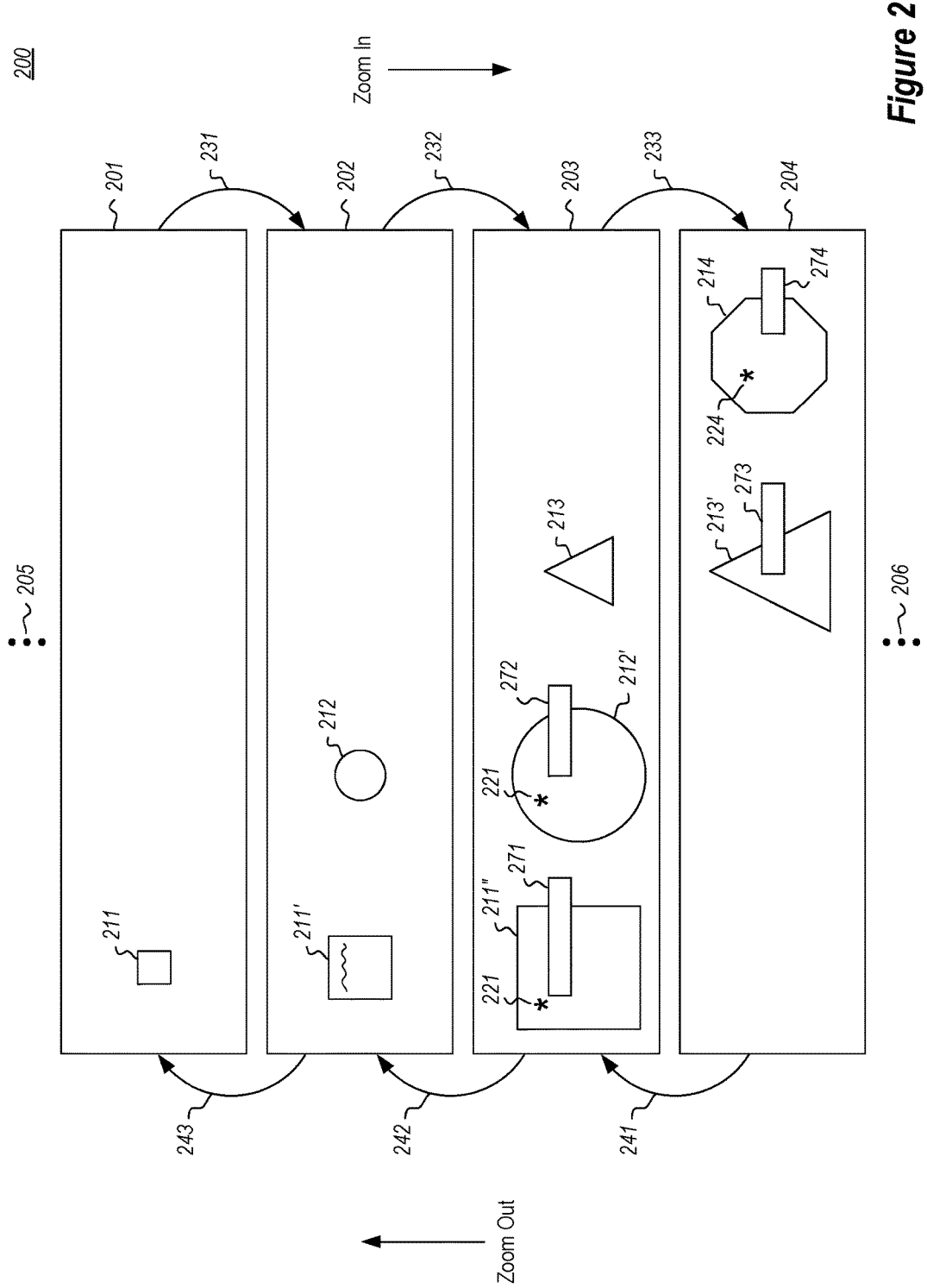
FIG. 2 symbolically represents a semantic zoom environment that has multiple levels of semantic zoom.

FIG. 2 symbolically represents a semantic zoom environment 200 that has multiple levels of semantic zoom. In the illustrated example, there are four levels 201, 202, 203 and 204 of semantic zoom illustrated. The ellipses 205 and 206, however, represent that the principles described herein may operate with any level of semantic zoom environment. As previously mentioned, in a semantic zoom environment, rather than simply display an object in larger form when zooming in on an object, the object may appear different upon zooming in and may even be operating upon by zooming in.

The semantic zoom environment 200 may include controls for zooming in from lower zoom levels to higher zoom levels (as represented by arrows 231, 232 and 233), and for zooming out from high zoom levels to lower zoom levels (as represented by arrows 241, 242 and 243). The semantic zoom environment 200 may be presented on, for instance, display that is one of the output mechanisms 112A of the computing system 100. Zooming operating input may be provided by one of the input mechanisms 112B of the computing system 100.

In accordance with at least the embodiments described herein, as one zooms in upon a displayed object, metadata associated with that displayed object may appear. Depending on the object, that object may first appear at one particular zoom level, while metadata regarding that object might also appear at that same level or at a more zoomed-in level. For instance, in the context of the semantic environment, there are four objects 211, 212, 213 and 214 shown.

Object 211 first appears at the least zoom level 201, and is represented generally as a square. Upon zooming in on the object 211 to zoom level 202, the object 211 changes somewhat to object 211', which is represented by a larger square showing that more details regarding the object 211 may be displayed, but no metadata is displayed yet. Upon zooming in on the object 211' to zoom level 203, the object 211' changes somewhat to object 211", thereby exposing selectable metadata 271 of the object 211 is exposed, represented by the asterisk 221.

Object 212 first appears at the second zoom level 202, and is represented generally as a circle. Upon zooming in on the object 212 to zoom level 203, the object 212 changes somewhat to object 212', and selectable metadata 272 of the object 212 is exposed, represented by asterisk 222.

Object 213 first appears at the third zoom level 203, and is represented generally as a triangle. Upon zooming in on the object 213 to zoom level 204, the object 213 changes somewhat to object 213', and selectable metadata 273 of the object 213 is exposed, represented by asterisk 223.

Object 214 first appears at the third zoom level 204, and is represented generally as octagon. Furthermore, selectable metadata 274 of the object 214 is shown at that same level, as represented by asterisk 224.

Accordingly, the principles described herein occur in a semantic zoom environment having multiple zoom levels. For any given object displayed in that semantic zoom environment, that object may first appear at a given zoom level, with selectable metadata about that displayed object also appearing either at that given zoom level or at some other zoom level. In any case, the selectable metadata may be selected to automatically generate a query on that metadata (and perhaps other properties as well) for data that is related in particular ways to that metadata to thereby populate a collection of data. If there is other than a default relationship between the selected metadata and the data sought by the query, the user may be given the option of selecting a relationship that the resulting data should satisfy with respect to the selected metadata.

While the query is being constructed, they could be suggestions of alternative queries such as additional terms for better results, refinements, and so forth. These alternative queries could be learned from common behaviors, or calculated otherwise to help user refine the query. One such example could be additional search terms suggested to users. For instance, imagine as user tries to create a new query that finds matching results for "Single-family" and "green paint", the user might be presented with a collection of one or more suggested queries (maybe most people search these three terms together), and decide to add it or not to the query.

The collection of data resulting from the query may itself be populated within the same or a different semantic zoom environment. This next semantic zoom environment may likewise expose selectable metadata on displayed objects, thereby allowing the process to repeat. Through this repeating of selecting metadata on displayed objects in successive semantic zoom environments, meaningful visual navigation to occur quickly through large quantities of data.

Figure 3:
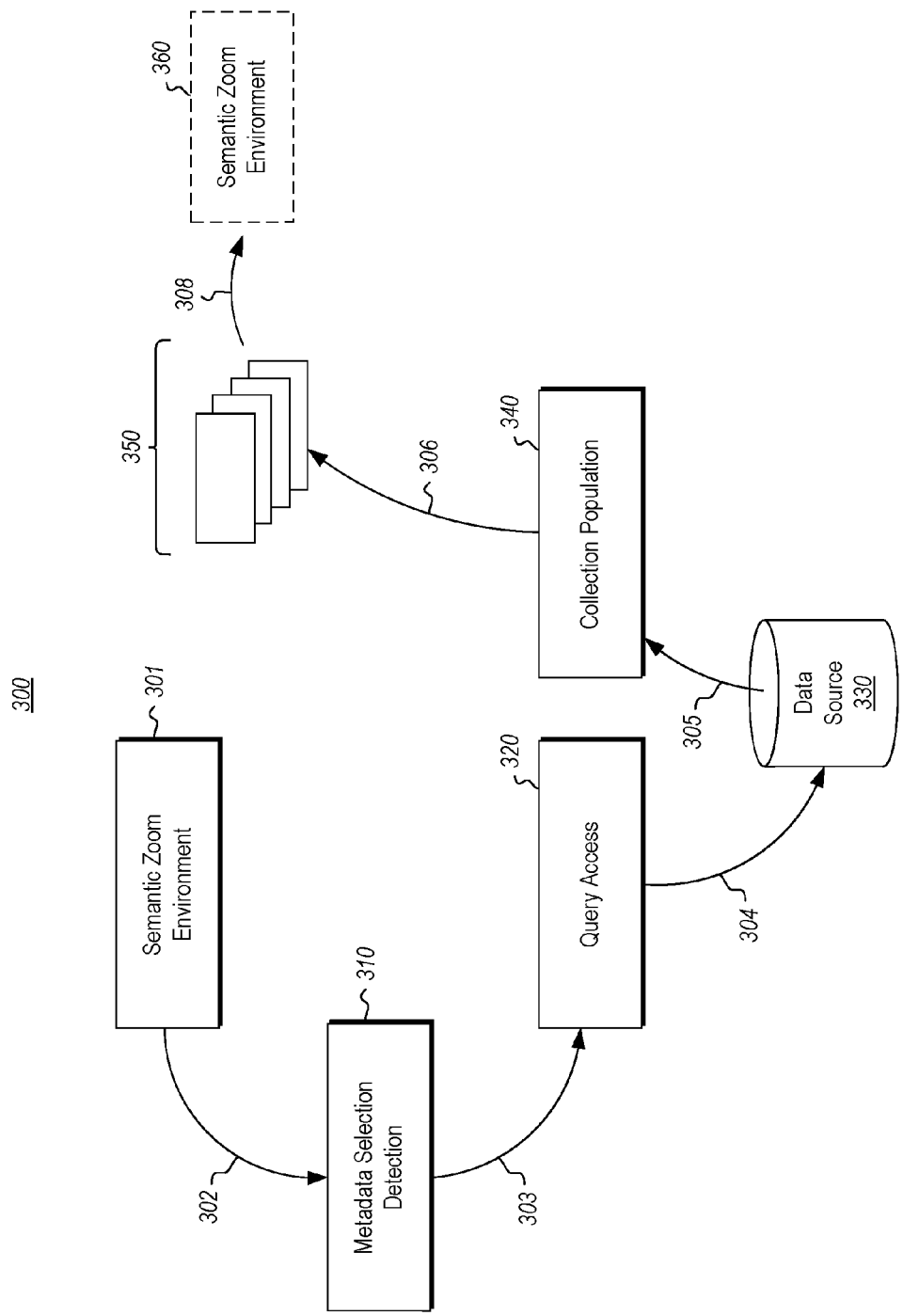
FIG. 3 illustrates an environment in which such semantic-zoom-based navigation may occur.

FIG. 3 illustrates an environment 300 in which such semantic-zoom-based navigation may occur. The environment 300 includes at least one semantic zoom environment 301 in which at least one of the semantic zoom levels shows metadata of a displayed object. For instance, the semantic zoom environment 301 may be a semantic zoom environment 200 as illustrated in FIG. 2. In any case, as is the case for the semantic zoom environment 200, in the semantic zoom environment 301, for at least one or some (and potentially all) of the displayed objects show metadata for the displayed object in at least one of the semantic zoom levels.

The environment 300 also includes a metadata selection detection module 310 that detects (as represented by arrow 302) user interaction with a particular metadata of the displayed object. In response (as represented by arrow 303), a query access module 320 then automatically submits (as represented by arrow 304) a query to a data source 330 using at least the particular selected metadata as a query parameter. The query may be, for instance, for data objects have a certain relationship to that metadata. In some embodiments, the data source that is queried against may depend on the identity of the selected metadata. A collection population module 340 populates (as represented by arrow 306) a collection 350 of objects having the metadata using the returned results (as represented by arrow 305) of the query responses. The metadata selection detection module 310, the query access module 320, and the collection population module 340 may be structured as described above for the executable component 106 of FIG. 6. The data source 330 may be, for instance, a file, a database, a cloud computing environment, or a composite of multiple data sources.

Although not required, this object collection 350 may be used to populate (as represented by arrow 308) the same zoom environment or another semantic zoom environment 360. This next semantic zoom environment 360 may likewise have multiple semantic zoom levels and display objects that at least at some semantic zoom level, has selectable metadata that again, when selected, causes an appropriate query to be generated against an appropriate data source (which may be the same of different than the data source queried in the prior metadata selection). Thus, the process may repeat, allowing the user to quickly and visually navigate to data of interest.

Figure 4:
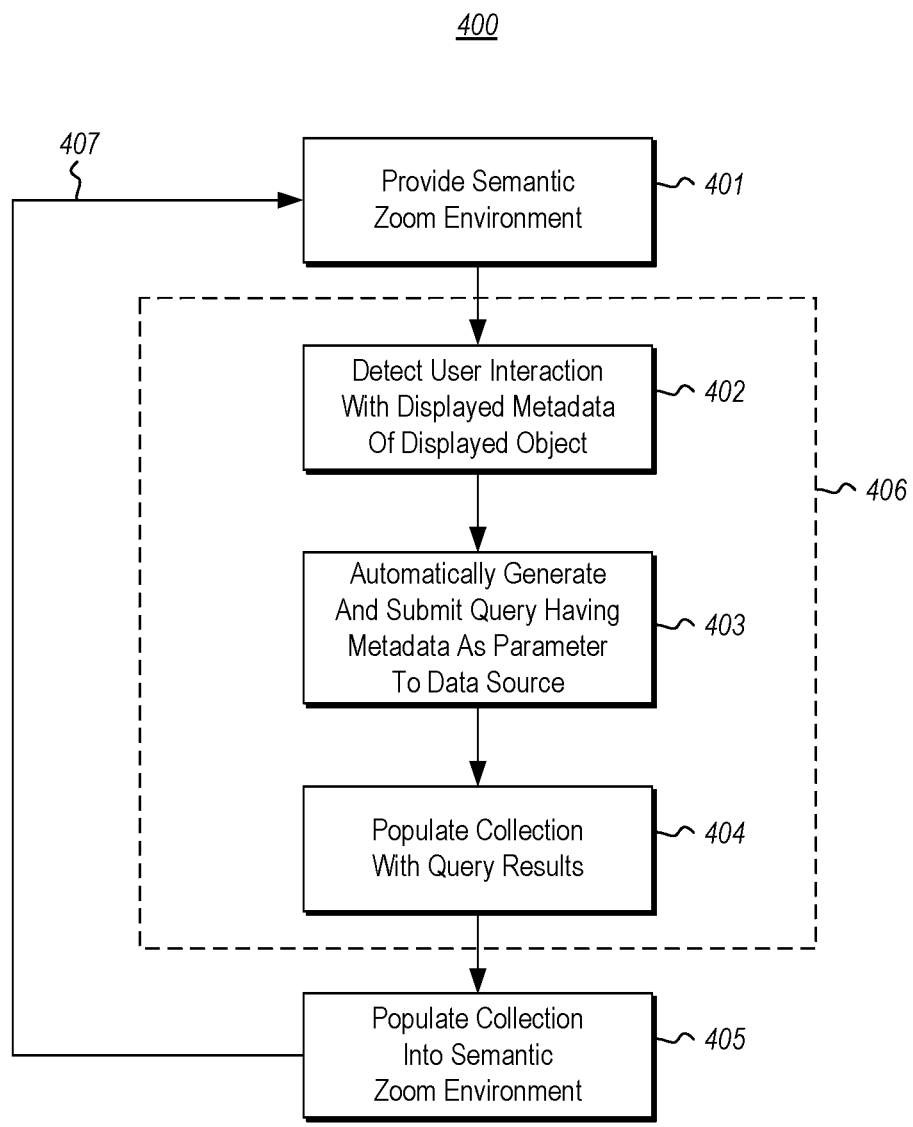
FIG. 4 illustrates a flowchart of a method for navigating in a semantic zooming environment.

FIG. 4 illustrates a flowchart of a method for navigating in a semantic zooming environment. The method 400 occurs in the context of a semantic zooming environment having been provided (act 401). Again, recall that the semantic zooming environment has multiple semantic zoom levels. Recall also that for at least one given displayed object, at least one of the semantic zoom, selectable metadata for the displayed object is also displayed. For instance, the semantic zoom environment could be the semantic zoom environment 200 of FIG. 2, and the displayed object could be the displayed object 211, which includes metadata that is selectable at zoom level 203. Another example of the semantic zoom environment is the semantic zoom environment 301 of FIG. 3.

While in this semantic zoom environment, user interaction is detected with particular selectable metadata of a displayed object (act 402). For instance, referring to FIG. 3, a metadata selection detection module 310 might detect (as represented by arrow 302) user interaction with a particular metadata of a displayed object.

In response to detecting the user interaction (act 402), a query is automatically generated and submitted (act 403) to a data source using at least a query parameter that corresponds to the selected metadata. In one embodiment, the query approximates in scope the selected metadata thereby allowing the user to change focus towards displayed objects having a particular relationship to the selected metadata as their own metadata. In yet another embodiment, the query uses both previously selected metadata and the current selected metadata to determine the query parameters. This allows the user to focus in more narrowly on the currently displayed objects.

Referring to FIG. 3, in response (as represented by arrow 303) to the user interacting with the particular selectable metadata (as represented by arrow 302), a query access module 320 automatically submits (as represented by arrow 304) a query to a data source 330 using at least the particular selected metadata as a query parameter. This automatic query may be further generated in response to a user selection of the type of relationship that the query results should have to the selected metadata.

In response to the query, collection is populated with objects is having the particular metadata (act 404). For instance, in FIG. 3, a collection population module 340 populates (as represented by arrow 306) a collection 350 of objects having the metadata using the returned results (as represented by arrow 305) of the query responses.

Optionally, the collection of objects having the semantic zooming environment may be populated into the same or a different semantic zoom environment (act 405). For instance, in FIG. 3, the object collection 350 is used to populate (as represented by arrow 308) the same zoom environment or another semantic zoom environment 360.

Acts 402 through 404 may be repeated (as represented by the dashed-lined box 406), to create multiple collections of objects based on interaction with the semantic zoom environment provided in act 401. Also, the entire method 400 may be repeated even within the context of one navigation session. For instance, the act 405 of presenting the collected data within a semantic zoom environment may be the same or lead to (as represented by arrow 407) the providing of a semantic zoom environment 401 for the next iteration of the method 400.

Examples of navigations scenarios that are enabled by the principles described herein will now be described. Suppose that there is a map application with many semantic zoom levels. As one zooms in further, neighborhoods and houses come into view. As one zooms in further, metadata is shown regarding each house. For instance, the metadata might include the year built.

By selecting on that metadata, the user might populate a collection of houses in that neighborhood that were built around that time period, or perhaps since that time period. The use might have been prompted for those query parameters. For instance, upon selecting upon the "year built" metadata of a particular house, the user might be presented with the option to search for houses that have been built within 5 years of the selected "year built" date, or which have been built since the selected "year built" date. The user might be prompted as to whether the user desires to change the search to focus on that date, or narrow the search to further restrict prior searches based on that "year built" date.

Now suppose that the user selects a region of 20 houses. Metadata regarding those twenty houses might appear. For instance, the average appraised value, square footage, year built, number of owners, the main styles of the houses might appear, allowing the user to select on this metadata that was generated recently when the selection of the region of 20 houses was made. The user might select on the average appraised value, allowing the use to find houses in the general area that have properties that have a particular relationship with the selected average appraised value (e.g., within 20 percent, at least, at most, and so forth). The newly populated houses might then be populated into a different of the same semantic zoom environment.

The user might then zoom into one of the houses and like the "master on the main" characteristic of one of the houses. If the user then selects that metadata, then the house search may change or narrow to show houses that have a master on the main. The resulting houses are then populated, and the user may see metadata on the property "virtual tour available?" having a value "Yes". Upon zooming in further upon a particular house, the user might see the inside of the house. The user may zoom in on a wall, whereupon the color of the wall is displayed as metadata. Upon selection, the user might be given the option of querying for nearby paint stores, and perhaps provide a color code that the paint store uses to obtain paint of that same color. Upon zooming in on a piece of art, metadata regarding the artist may appear. Upon selecting that artist, the user might be provided with a collection of works of art (perhaps in a virtual gallery that is semantically zoomable) showing other works of art of that artist. If the user finds that he has been sidetracked, a simple control may be used to back up to the prior semantic zoom environment.

Accordingly, the principles described herein provide an effective and efficient way for users to control how navigation occurs in semantic zoom environments to quickly obtain data of interest. Thus, amongst a massive quantity of potential data, the user may quickly narrow in on what peaks his or her interest. A house search can lead to finding a house of interest to tour, but may likewise turn into a purchase of paint, or a piece of artwork. Thus, the principles described herein provide an efficient and flexible semantic zooming experience. Potentially multiple or even many semantic zoom environments may be traversed. Even the very objective of the search may change as the user finds data that is more interesting than what they originally sought out finding.

As another example, suppose that the user is zooming in on a database of employees. At some point, each employee is represented. Metadata for that employee may then appear indicating that a bar graph visualization is available showing historic salary levels for that employee, the user may then select that metadata, resulting in a query being generated for all bar graph visualizations for employees. Upon the various bar graphs, the user might zoom in on a particular bar of the bar graph and see a salary level as metadata. The user might then select that salary level, indicate the relationship to be "within 10 percent" and query all employees that have a salary within 10 percent of the selected salary.

That said, these examples are mere examples only, the principles described herein enable an infinite variety of navigation possibilities, regardless of the semantic zoom environment, regardless of the displayed objects, and regardless of the data sources available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more tangible computer-readable media having thereon computer-executable instructions that are structured such that, when executed by the one or more processors, the computing system is adapted to provide a semantic zoom environment that has multiple semantic zoom levels, and that facilitates navigation in the environment in response to user input by performing the following:
displaying a first representation of an object within the semantic zoom environment, the first representation being presented based on the semantic zoom environment presenting a first semantic zoom level;
in response to user input, displaying a second representation of the object within the semantic zoom environment, including displaying an indication that there is metadata associated with the object, the second representation and the indication that there is metadata associated with the object being displayed based on the semantic zoom environment presenting a second semantic zoom level;
in response to detecting user interaction with the indication that there is metadata associated with the object, generating a query using one or more query parameters relating to the metadata associated with the object, including presenting at least one suggested query parameter to alter the query;
querying a data source using the query; and
in response to querying the data source, populating one or more semantic zoom environments with a collection of objects having a particular relationship to the one or more query parameters.

2. The computing system in accordance with claim 1, the particular metadata comprising one or more properties of the displayed object.

3. The computing system in accordance with claim 1, the particular metadata comprising one or more property values of the displayed object.

4. The computing system in accordance with claim 1, the particular metadata comprising generated metadata.

5. The computing system in accordance with claim 1, the particular metadata comprising a visualization type of data contained within the displayed object.

6. The computing system in accordance with claim 1, the particular metadata comprising metadata that corresponds to an aggregation of displayed objects including the displayed object.

7. The computing system in accordance with claim 1, the data source comprising a file, a database, or a cloud computing environment.

8. The computing system in accordance with claim 1, the data source comprising a composite of multiple data sources.

9. A method, implemented at a computer system that includes one or more processors, for navigating in a semantic zooming environment, the method comprising:
displaying a first representation of an object within the semantic zoom environment, the first representation being presented based on the semantic zoom environment presenting a first semantic zoom level;
in response to user input, displaying a second representation of the object within the semantic zoom environment, including displaying an indication that there is metadata associated with the object, the second representation and the indication that there is metadata associated with the object being displayed based on the semantic zoom environment presenting a second semantic zoom level;
in response to detecting user interaction with the indication that there is metadata associated with the object, generating a query using one or more query parameters relating to the metadata associated with the object including presenting an option for selecting a relationship that a query response should satisfy with respect to the metadata associated with the object;
querying a data source using the query; and
in response to querying the data source, populating one or more semantic zoom environments with a collection of objects having a particular relationship, defined by the selected relationship, to the one or more query parameters.

10. The method in accordance with claim 9, the one or more semantic zooming environments populated with the collection of objects being different than the semantic zooming environment displaying the first representation of the object.

11. The method in accordance with claim 9, the displayed object being a first displayed object, the collection being populated within a semantic zooming environment also having multiple zoom levels, at least one of which showing metadata of a second displayed object that is within the collection.

12. The method in accordance with claim 11, further comprising:
detecting user interaction with particular metadata of the second displayed object;
in response to detecting the user interaction with the particular metadata of the second displayed object, automatically querying a particular data source using a second query that is based on at least the particular metadata of the second displayed object as a query parameter; and
in response to second query, populating a second collection of objects having a relationship to the particular metadata of the second object.

13. The method in accordance with claim 12, the particular data source automatically queried in response to detecting user interaction with the particular metadata of the second displayed object being different than the data source queried in response to detecting user interaction with the indication that there is metadata associated with the displayed object.

14. The method in accordance with claim 12, the particular data source automatically queried in response to detecting user interaction with the particular metadata of the second displayed object being the same as than the data source queried in response to detecting user interaction with the indication that there is metadata associated with the displayed object.

15. A computer program product comprising one or more tangible computer-readable media having thereon computer-executable instructions that are structured such that, when executed by one or more processors of a computer system, the computer system performs the following:
displaying a first representation of an object within a semantic zoom environment, the first representation being presented based on the semantic zoom environment presenting a first semantic zoom level;
in response to user input, displaying a second representation of the object within the semantic zoom environment, including displaying an indication that there is metadata associated with the object, the second representation and the indication that there is metadata associated with the object being displayed based on the semantic zoom environment presenting a second semantic zoom level;
in response to detecting user interaction with the indication that there is metadata associated with the object, generating a query using one or more query parameters relating to the metadata associated with the object, wherein generating the query includes presenting at least one suggested query parameter to alter the query and/or presenting an option for selecting a relationship that a query response should satisfy with respect to the metadata associated with the object;
querying a data source using the query; and
in response to querying the data source, populating one or more semantic zoom environments with a collection of objects having a particular relationship to the one or more query parameters.

16. The computer program product of claim 15, the particular metadata comprising generated metadata.

17. The computer system of claim 1, wherein the at least one suggestion to alter the query comprises a suggestion derived from a learned common behavior of a user that provided the user input.

18. The computer system of claim 1, wherein the at least one suggestion to alter the query comprises a query term that further refines a previous query.

19. The computer system of claim 1, wherein the at least one suggestion to alter the query can be accepted or rejected by a user that provided the user input.

20. The computer system of claim 19, wherein the user accepting the at least one suggestion to alter the query causes the altered query to be used when querying the data source.

* * * * *